United States Patent [19]

Hilfman

[11] 3,900,388
[45] Aug. 19, 1975

[54] REMOVAL OF AROMATIC IMPURITIES
[75] Inventor: Lee Hilfman, Mt. Prospect, Ill.
[73] Assignee: Universal Oil Products Company, Des Plaines, Ill.
[22] Filed: July 30, 1973
[21] Appl. No.: 383,754

[52] U.S. Cl................................ 208/143; 260/667
[51] Int. Cl.............................................. C10g 23/02
[58] Field of Search..................................... 208/143

[56] References Cited
UNITED STATES PATENTS
3,201,342  8/1965  Bachman et al..................... 208/143
3,259,589  7/1966  Michalko........................ 252/466 B
3,703,461  11/1972  Hansford............................ 208/143

*Primary Examiner*—C. Davis
*Attorney, Agent, or Firm*—James R. Hoatson, Jr.; Raymond H. Nelson; Page, II: William H.

[57] ABSTRACT

A process for the removal of aromatic impurities from a paraffinic charge stock which comprises the treatment of said charge stock in an atmosphere comprising hydrogen in the presence of a catalyst comprising a metal selected from Group VIII of the Periodic Table on an inorganic oxide support, said Group VIII metal having been surface-impregnated on said support.

6 Claims, No Drawings

REMOVAL OF AROMATIC IMPURITIES

This invention relates to a process for the removal of aromatic impurities. More specifically, this invention relates to a process for the removal of aromatic impurities from a paraffinic charge stock which comprises the treatment of said charge stock with an atmosphere comprising hydrogen in the presence of a catalyst comprising a metal selected from Group VIII of the Periodic Table on an inorganic oxide support, said Group VIII metal having been surface-impregnated on said support.

It has been shown in the prior art that Group VIII metals may be surface-impregnated onto a porous like material such as certain inorganic oxide supports in the treatment of a $C_4$-acetylene admixture (unsaturated hydrocarbons) so as to form varying degrees of saturated compounds. Surface-impregnated catalysts have achieved an individual status in the art of catalysis and are considered unique by expert opinions of those skilled in the art of catalysis. However, the merits of the advantage of utilization of surface-impregnated catalyst for the removal of the aromatic impurities from paraffinic charge stocks has not yet been given recognition. Various sources of prior art have discussed methods and techniques of catalyst composite but it should be noted that any one of these methods may be utilized in the preparation of the hereinafter discussed catalyst composite with the only restriction being that the support is surface-impregnated with a metal selected from Group VIII of the Periodic Table. The prior art has also disclosed that paraffinic charge stocks may be purified by treatment with hydrogen in the presence of an inorganic oxide support possessing the uniform dispersal of a Group VIII metal.

In contradistiction to the prior art, it has now been discovered that the quantity of aromatic impurities in a paraffinic charge stock can be decreased by the utilization of a catalyst during hydrogen treatment comprising a metal selected from Group VIII of the Periodic Table on an inorganic oxide support, said Group VIII metal being surface-impregnated upon the inorganic oxide support. The utilization of the above cited invention will enable the manufacturer of paraffinic charge obtained from a molecular sieve separation to obtain a higher price for the final substantially aromatic-free paraffin charge as a result of the greater purity of the final product. The consumer will not have to bear any additional cost in any of the end products formed from the paraffinic charge stock as a result of the elimination of waste by-products and the maximum reaction efficiency of the paraffinic charge stock. The removal of the aromatic impurities will also enable the manufacturer to supply the makers of secondary alcohols with a paraffinic charge stock which is most readily oxidizable to the corresponding primary or secondary alcohols.

The desired products of the process of this invention, namely, the substantially aromatic-free paraffinic charge stock can be utilized in the chemical industry in many ways. For example, a paraffinic charge may be oxidized by air in the presence of boron oxide to give high yield of secondary alcohols. Likewise, various ketones and carboxylic acids may be obtained from the oxidation of normal paraffinic charge stocks. Paraffinic charge stocks which are substantially free of aromatic impurities may also be used in the manufacture of paraffinic candles, wax paper, waterproofing wood, waterproofing cork, impregnating matches, preserving eggs, as an ingredient in oil crayons, as stoppers for acid bottles, as preservative covers for food products, as electrical insulation, as a preservative for railroad ties, as a preservative for phonographic records, floor polishes, as an extraction of perfumes from flowers, cosmetics, in photography, as an anti-frothing agent in sugar refining, for packaging of tobacco products, and for the coating of the interior of wine casks.

It is therefore an object of this invention to provide a process for the removal of aromatic impurities from a paraffinic charge stock.

A further object of this invention is to provide a process for the removal of aromatic impurities from a paraffinic charge stock utilizing certain catalytic compositions of matter which will permit the recovery of the desired substantially aromatic-free paraffinic charge stock in a more expedient manner.

In one aspect an embodiment of this invention resides in a process for the removal of aromatic impurities from a paraffinic charge stock which comprises the treatment of said charge stock with an atmosphere comprising hydrogen in the presence of a catalyst comprising a metal selected from Group VIII of the Periodic Table on an inorganic oxide support, said Group VIII metal having been impregnated on the surface of said support, at reaction conditions and recovering the resultant substantially aromatic-free paraffinic charge stock.

A specific embodiment of this invention resides in a process for the removal of aromatic impurities which comprises the treatment of a paraffinic charge stock possessing a boiling point of from about 206°C to about 287°C obtained from a molecular sieve separation with a platinum catalyst on an alumina support, said support having been surface-impregnated with the platinum metal, in the presence of hydrogen at a pressure of 1000 pounds per square inch, a temperature of 280°C and a liquid hourly space velocity of 2.0 and recovering the resultant substantially aromatic-free paraffinic charge stock.

Other objects and embodiments will be found in the following detailed description of the present invention.

As hereinbefore set forth, the present invention is concerned with a process for the removal of aromatic impurities from a paraffinic charge stock by the purification of said charge stock by treatment in an atmosphere comprising hydrogen in the presence of certain catalytic compositions of matter and recovering the resultant substantially aromatic-free paraffinic charge stock. The reaction is effected under conditions which include an elevated temperature in the range of from about 200°C to about 500°C and preferably in the range of from about 250°C to about 350°C. In addition, another reaction condition involves pressure, said pressure ranging from about 1000 pounds per square inch to about 4000 pounds per square inch. The superatmospheric pressure employed in this process is afforded by the introduction of hydrogen plus any substantially inert gas such as nitrogen or helium into the reaction zone, the particular pressure which is used being that which is necessary to effectuate the removal of the aromatic impurities of the paraffinic charge stock. Still another reaction condition involved in the removal of the aromatic impurities from the paraffinic charge stock is the liquid hourly space velocity. The liquid hourly space velocity is defined as the volume of the charge stock charged to the reaction zone per hour per volume of catalyst present within the reaction zone. In the process of this invention the liquid hourly space velocity is monitored within the range of from about 0.1 to about 10.0 depending upon the quantity of impurities necessary to be removed.

The catalytic compositions of matter which are contemplated within the scope of the present invention comprise a metal selected from Group VIII of the Periodic Table on an inorganic oxide support. The metal selected from Group VIII of the Periodic Table is dispersed on the outer surface area of the inorganic oxide support as contrasted to the total surface area of the support and is not uniformly impregnated on the total surface area, said dispersion being herein nomenclatured as surface-impregnation. The surface-impregnation may be effected in a manner known to the art such as disclosed in U.S. Pat. No. 3,259,589. It is contemplated within the scope of the catalyst composite that the inorganic oxide support may be formed into various shapes such as spherical, square, cylindrical, oval, etc., as long as the support is surface-impregnated with a metal selected from Group VIII of the Periodic Table. Suitable examples of metals which may be selected from Group VIII of the Periodic Table would include iron, cobalt, nickel, ruthenium, rhodium, palladium, osmium, iridium and platinum while the suitable examples of inorganic oxide supports which may be surface-impregnated would include alumina, silica, magnesia, phosphorous oxide, arsenic oxide, thoria, zirconia and telluria or mixtures thereof such as alumina-magnesia, silica-arsenic oxide, zirconia-thoria, etc.

Examples of suitable paraffinic charge stocks utilized in this process include all paraffinic admixtures of normal and branched-chained paraffinic charge stocks, purely normal paraffinic charge stocks or purely branched-chained paraffinic charge stocks, all of which are contemplated spanning various carbon ranges including, but not limited to $C_3$–$C_6$, $C_6$–$C_9$, $C_9$–$C_{11}$, $C_{11}$–$C_{14}$, $C_{15}$–$C_{18}$, etc. Specific examples of paraffinic charge stocks may be nomenclatured by their boiling point such as a charge stock possessing a boiling point from about 206°C to about 287°C or a charge stock possessing a boiling point from about 150°C to about 200°C, etc.

It is understood that the aforementioned Group VIII metals, inorganic oxide supports, and paraffinic charge stocks are only representative of the class of elements, compounds and mixtures which may be treated or utilized in the present invention and that the process is not necessarily limited thereto.

The process of this invention may be effected in any suitable manner and may comprise either a batch or a continuous type of operation. For example, when a batch type operation is employed the paraffinic charge stock is placed in an appropriate vessel such as a pressure-resistant autoclave along with a Group VIII metal which has been surface-impregnated on an inorganic oxide support. The autoclave is sealed and hydrogen gas or a mixture of hydrogen and nitrogen gas is pressed in until the desired operating pressure is obtained. The autoclave is then heated to the desired operating temperature and maintained thereat for a period of time comprising of from about 0.3 to about 30 hours or more. At the end of this time, the autoclave is allowed to return to room temperature and ambient pressure by the termination of the heat and the discharge of any of the remaining hydrogen and nitrogen gas. The autoclave is opened and the paraffinic charge stock is found to be substantially aromatic-free.

It is also contemplated within the scope of this invention that the reaction process for removal of the aromatic impurities may be effected in a continuous manner of operation. When such a type of operation is employed, the paraffinic charge stock is continually charged to a reaction vessel at a predetermined liquid hourly space velocity while the reaction vessel is maintained at the proper operating conditions of temperature and pressure. The superatmospheric pressures are afforded by the introduction of hydrogen gas or a mixture of hydrogen and another inert gas such as nitrogen or helium and maintained at a constant predetermined level. After completion of the desired residence time, the reactor effluent comprising the paraffinic charge stock is continuously withdrawn and subjected to conventional means of separation whereby the substantially aromatic-free paraffinic charge stock is recovered while any catalyst is recharged to the reaction zone. Inasmuch as the catalytic composition of matter is solid in nature, various types of continuous operations may be used. One such type of operation comprises the fixed bed method in which the catalyst is disposed as a fixed bed in the reaction zone and the paraffinic charge stock is passed over said fixed bed in either upward or downward flow. Another type of operation which may be employed comprises the moving bed type operation in which the catalyst and the paraffinic charge stock are passed through the reaction zone either concurrently or countercurrently to each other, or the slurry type of operation in which the catalyst is carried into the reaction zone as a slurry in the paraffinic charge stock.

The following examples are given to illustrate the process of the present invention which, however, are not intended to limit the generally broad scope of the present invention in strict accordance therewith.

EXAMPLE I

In this example a paraffinic charge stock possessing a boiling point ranging from about 206°C to about 287°C and an aromatic content of 1.5 volume percent was charged to a reaction zone containing a catalyst comprising 0.75 percent platinum uniformly dispersed on alumina, said reaction zone being equipped with heating and hydrogen entry devices. The reaction zone was maintained at a temperature of about 280°C and a hydrogen pressure of 1000 pounds per square inch. The paraffinic charge stock was allowed to enter the reaction zone at a rate of 1.0 liquid hourly space velocity and removed after the predetermined residence time as the reactor effluent. The reactor effluent comprising the product was separated from any catalyst acquired through passage of the reaction zone and analyzed by means of ultraviolet spectroscopy instrumentation, said analysis disclosed the product to possess an aromatic impurities level of 35.0 parts per million.

EXAMPLE II

In the example the same paraffinic charge stock utilized in Example I hereinbefore set forth possessing a boiling point ranging from about 206°C to about 287°C and an aromatic content of 1.5 volume percent were charged to a reaction zone containing a catalyst comprising 0.75 percent platinum surface-impregnated on alumina, siad reaction zone being equipped with heating and hydrogen entry devices. The reaction zone was maintained at a temperature of about 280°C and a hydrogen pressure of 1000 pounds per square inch. The paraffinic charge stock was allowed to enter the reaction zone at a rate of 1.0 liquid hourly space velocity and removed after the predetermined residence time as the reactor effluent. The reactor effluent comprising the product was separated from any catalyst acquired through passage of the reaction zone and analyzed by means of ultraviolet spectroscopy instrumentation, said analysis disclosed the product to possess aromatic impurities of 10.4 parts per million.

It can be clearly seen in a comparison of Example II to Example I that the surface-impregnation of the catalyst accounted for a three-fold diminution of the aromatic impurities (35.0 parts per million [Example I]in comparison to 10.4 parts per million [Example II]).

EXAMPLE III

In this example a paraffinic charge stock possessing a boiling point ranging from about 206°C to about 287°C and an aromatic content of 1.5 volume percent was charged to a reaction zone containing a catalyst comprising 0.75 percent platinum uniformly dispersed on alumina, said reaction zone being equipped with heating and hydrogen entry devices. The reaction zone was maintained at a temperature of about 260°C and a hydrogen pressure of 1000 pounds per square inch. The paraffinic charge stock was allowed to enter the reaction zone at a rate of 1.0 liquid hourly space velocity and removed after the predetermined residence time as the reactor effluent. The reactor effluent comprising the product was separated from any catalyst acquired through passage of the reaction zone and analyzed by means of ultraviolet spectroscopy instrumentation, said analysis disclosing the product to possess an aromatic impurities level of 33.0 parts per million.

EXAMPLE IV

In this example the same paraffinic charge stock utilized in Examples I through III hereinbefore set forth possessing a boiling point ranging from about 206°C to about 287°C and an aromatic content of about 1.5 volume percent was charged to a reaction zone containing a catalyst comprising 0.75 percent platinum surface-impregnated on alumina, said reaction zone being equipped with heating and hydrogen entry devices. The reaction zone was maintained at a temperature of about 260°C and a hydrogen pressure of 1000 pounds per square inch. The paraffinic charge stock was allowed to enter the reaction zone at a rate of 1.0 liquid hourly space velocity and removed after the predetermined residence time as a reactor effluent. The reactor effluent comprising the product was separated from any catalyst acquired through passage of the reaction zone and analyzed by means of ultraviolet spectroscopy instrumentation, said analysis disclosed the product to possess aromatic impurities of 9.0 parts per million.

It can be clearly seen in a comparison of Example III and Example IV that the surface-impregnation of the catalyst accounted for a greater than three-fold diminution of the aromatic impurities (33.0 parts per million [Example III] in comparison to 9.0 parts per million [Example IV]).

EXAMPLE V

In this example a paraffinic charge stock possessing a boiling point ranging from about 206°C to about 287°C and an aromatic content of 1.5 volume percent was charged to a reaction zone containing a catalyst comprising 0.75 percent platinum uniformly dispersed on alumina, said reaction zone being equipped with heating and hydrogen entry devices. The reaction zone was maintained at a temperature of about 260°C and a hydrogen pressure of 850 pounds per square inch. The paraffinic charge stock was allowed to enter the reaction zone at a rate of 1.0 liquid hourly space velocity and removed after the predetermined residence time as the reactor effluent. The reactor effluent comprising the product was separated from any catalyst acquired through passage of the reaction zone and analyzed by means of ultraviolet spectroscopy instrumentation, said analysis disclosed the product to possess aromatic impurities of 59.0 parts per million.

EXAMPLE VI

In this example the same paraffinic charge stock utilized in Examples I through V hereinbefore set forth possessing a boiling point range of from about 206°C to about 287°C and an aromatic content of 1.5 volume percent was charged to a reaction zone containing a catalyst comprising 0.75 percent platinum surface-impregnated on alumina, said reaction zone being equipped with heating and hydrogen entry devices. The reaction zone was maintained at a temperature of about 260°C and a hydrogen pressure of 850 pounds per square inch. The paraffinic charge stock was allowed to enter the reaction zone at a rate of 1.0 liquid hourly space velocity and removed after the predetermined residence time as the reactor effluent. The reactor effluent comprising the product was separated from any catalyst acquired through passage of the reaction zone and analyzed by means of ultraviolet spectroscopy instrumentation, said analysis disclosed the product to possess aromatic impurities of 6.0 parts per million.

It can be clearly seen in a comparison of Example VI to Example V that the surface-impregnation of the catalyst accounted for a greater than six-fold diminution of the aromatic impurities (59.0 parts per million [Example V] in comparison to 6.0 parts per million [Example VI]).

EXAMPLE VII

In this example a paraffinic charge stock possessing a boiling point range of from about 150°C to about 200°C and a substantial amount of aromatic impurities is charged to an autoclave containing palladium which is surface-impregnated on a silica surface, said autoclave being equipped with heat and hydrogen pressure attainment devices. The autoclave is heated to a temperature of 150°C and maintained at a hydrogen pressure of 1500 pounds per square inch by the forced entry of hydrogen for a period of time comprising five hours. At the end of this time heating and hydrogen flow are terminated and the autoclave vented, thereby allowing the autoclave to return to room temperature and atmospheric pressure. The product is removed from the autoclave, separated from the catalyst and analyzed by means of ultraviolet spectroscopy instrumentation, said analysis disclosing a lower percentage of aromatic impurities than would be disclosed in an example in which the paraffinic charge stock had been treated with a catalyst comprising palladium uniformly dispersed on the silica support.

I claim as my invention:

1. A process for the removal of aromatic impurities from a paraffinic charge stock which comprises contacting said charge stock, in a hydrogen-containing atmosphere, with an inorganic oxide support impregnated with a catalytically effective amount of a metal from Group VIII of the Periodic Table, substantially all of said metal being dispersed on the outer surface of said support without appreciable dispersion of the metal within the support, said contacting being at a temperature of from about 200°C. to about 500°C., a pressure of from about 100 to about 4,000 pounds per square inch and a liquid hourly space velocity of from about 0.1 to about 10.0 and recovering the resultant paraffinic charge stock of reduced aromatic content.

2. The process of claim 1 further characterized in that the metal from Group VIII of the Periodic Table is platinum.

3. The process of claim 1 further characterized in that the metal from Group VIII of the Periodic Table is palladium.

4. The process of claim 1 further characterized in that the impregnated inorganic oxide support is alumina.

5. The process of claim 1 further characterized in that the impregnated inorganic oxide support is silica.

6. The process of claim 1 further characterized in that the paraffinic charge possesses a boiling point ranging from about 206°C to about 287°C.

* * * * *